United States Patent [19]

Oldigs

[11] Patent Number: 4,808,929

[45] Date of Patent: Feb. 28, 1989

[54] SHIELDED INDUCTION SENSOR FOR WELL LOGGING

[75] Inventor: Richard W. Oldigs, Huffman, Tex.

[73] Assignee: Schlumberger Technology Corporation, Houston, Tex.

[21] Appl. No.: 53,589

[22] Filed: May 19, 1987

Related U.S. Application Data

[63] Continuation of Ser. No. 551,239, Nov. 14, 1983, abandoned.

[51] Int. Cl.[4] .................... G01V 3/18; H01Q 1/52
[52] U.S. Cl. ..................... 324/339; 336/84 C; 343/841
[58] Field of Search ............... 324/338–342; 336/84 C; 343/841, 842

[56] References Cited

U.S. PATENT DOCUMENTS

| | | | |
|---|---|---|---|
| 2,263,923 | 12/1952 | Zimmerman | 324/333 |
| 3,013,102 | 12/1961 | Doll | 336/84 |
| 3,063,135 | 11/1962 | Clark | 336/84 C |
| 3,094,658 | 6/1963 | Bravenec et al. | 324/373 |
| 3,181,057 | 4/1965 | Bravenec | 324/373 |
| 4,220,920 | 9/1980 | Gross | 324/442 |
| 4,314,191 | 3/1982 | Meador et al. | 324/341 |
| 4,511,843 | 4/1985 | Thoraval | 324/338 |
| 4,536,714 | 8/1985 | Clark | 324/338 |
| 4,546,314 | 10/1985 | Minergo et al. | 324/346 |

Primary Examiner—Reinhard J. Eisenzopf
Assistant Examiner—Walter E. Snow
Attorney, Agent, or Firm—Henry N. Garrana; John H. Bouchard

[57] ABSTRACT

A shielded solenoid for use in well logging is disclosed in which a cylindrical or solenoidal coil is provided in a support member. A shield is spirally wrapped about the wall of the support member and the coil. The resulting toroidally shaped shield has its individual turns cut so that no complete electrical path exists in each loop of the shield. Each loop of the coil is electrically connected to a ground ring. The shielded solenoid is capacitively shielded from the borehole environment. The shielding is effective because the shielding conductors are effectively transparent to TE electromagnetic fields generated by alternating current flow in the cylindrical coil and substantially eliminate TM electromagnetic fields generation by such current flow.

This abstract of the disclosure is neither intended to define the scope of the invention, which is measured by the claims, nor is it intended to limit the invention in any way.

15 Claims, 1 Drawing Sheet

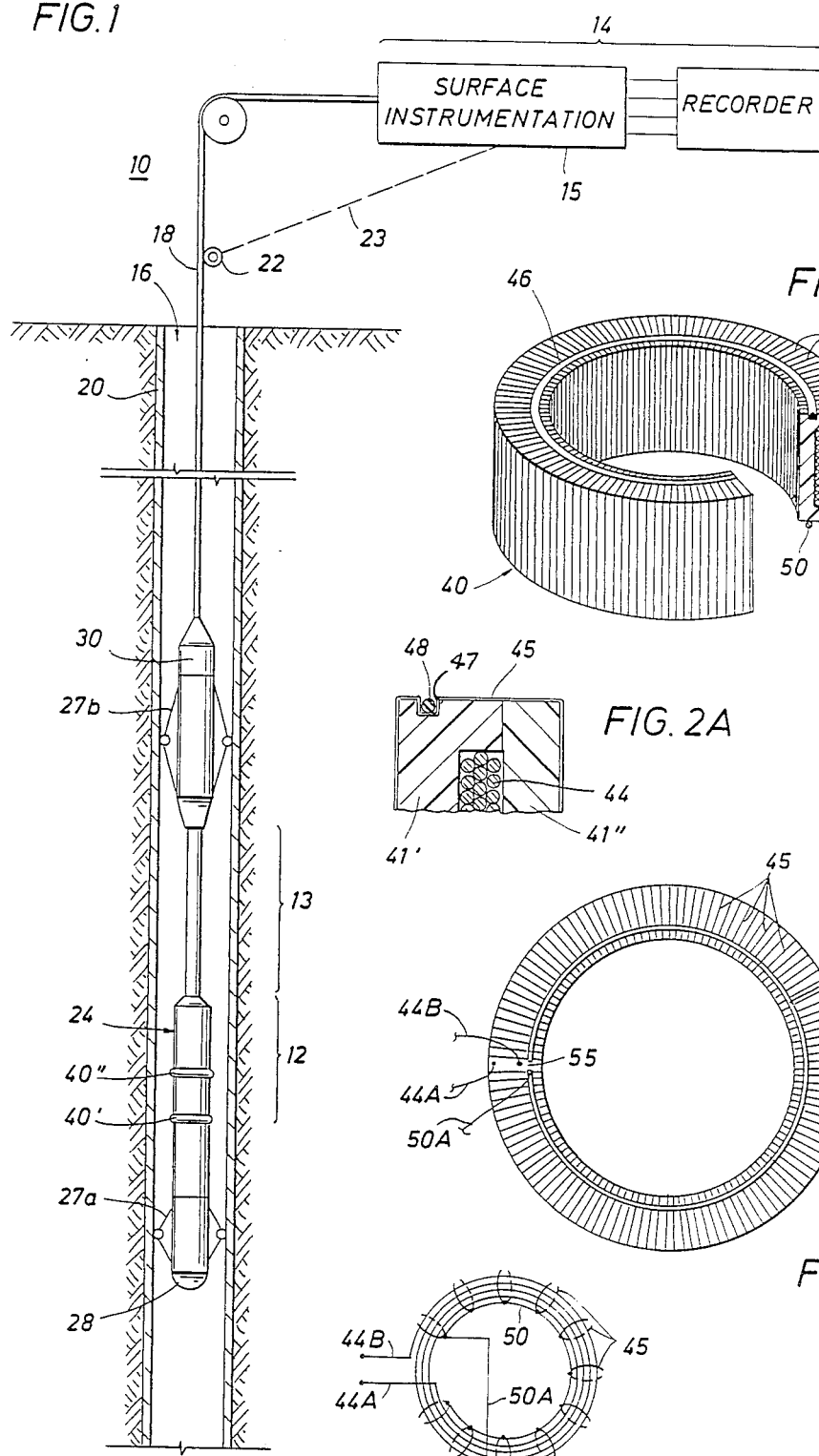

SHIELDED INDUCTION SENSOR FOR WELL LOGGING

This is a continuation of application Ser. No. 551,239 filed Nov. 14, 1983, now abandoned.

BACKGROUND OF THE INVENTION

1. Field of the Invention

The invention disclosed below relates in general to a shielded solenoid coil used in well logging. More particularly, the invention relates to a shielded induction coil useful as a sensor in a borehole logging tool and relates to the method and apparatus for shielding such coil from the capacitive effects of the borehole and other coils and apparatus of a logging tool with which the coil is associated.

2. Description of the Prior Art

Electromagnetic well logging tools have for many years employed solenoids for transmitters, receivers and other coils. Examples of such tools have included induction logging tools and electromagnetic thickness tools. The solenoidal coils are used in a number of different ways, but in general, a magnetic flux distribution is generated coaxially in the coil which interacts with the medium being measured.

For example, in an induction measurement in an open hole borehole, the magnetic field generated by alternating current in the coil creates loop or eddy currents in the surrounding formation. The receiver coil interacts with the flux associated with the eddy currents in the formation and generates a voltage signal proportional to the resistivity or conductivity of the formation.

As another example, in a electronic caliper measurement of the inside diameter of a casing, two coaxial coils are provided including a transmitter coil in which is generated an AC exciting current. A receiver coil disposed a longitudinal distance from the transmitter coil produces an induced voltage in response to the transmitter current and the impedance effect of the casing. From such exciting current and response voltage, the inside diameter of the casing may be determined.

The fundamental measurement effect of such coils is the magnetic lines of flux which are generated coaxially in the solenoidal coil. Capacitive coupling of such coils has plagued the designers of well logging equipment over the years. For example, in an induction logging environment, capacitive coupling can be detrimental to the measurement when the dieletric medium, i.e., the borehole environment, changes. In order to reduce capacitive coupling to a minimum, the prior art has provided shields about the individual coils. Such shields have included copper fingers printed on a flexible substraight. Such cylindrical shield is then wrapped about the coil.

A major shortcoming of these shields for use in induction logging is that they must be removed when balancing the transmitter, receiver and bucking coils since such coils must be physically moved in order to balance the system. The effect of these shields is small during the balancing process, but it is not negligible and cannot be balanced out easily because the shields are not present during the balancing process.

Where such solenoidal coils are used as an electronic caliper, for example, in a electromagnetic thickness tool system, the coils must be closely spaced. The prior art shields have failed to prevent capacitive coupling through the ends of the solenoid. Such coupling has in the past created problems in the design of electronic caliper coil systems in that the closer that the transmitter coil is spaced to the receiver coil, the greater the capacitive coupling has been through the ends of the coils.

SUMMARY OF THE INVENTION

It is therefore an object of the invention to provide a shield design for a solenoidal coil which comprises a self-contained unit thereby providing ease of balancing such coils for induction logging equipment.

It is another object of the invention to shield the ends of the coils so that capacitive end effects of such coils are substantially eliminated.

It is another object of the invention to provide a shield in which the shielding wires have no eddy currents flowing in them which result in response to transmitter currents flowing in the solenoidal coil thereby inhibiting spurious signals in induction measurements.

It is another object of the invention to provide sufficient spacing between coil windings and shield windings in order to minimize coil to shield capacitance.

It is another object of the invention to provide a shield about a solenoidal coil whereby the shield effectively is transparent to transverse electric fields generated by alternating current in the sensor conductor and substantially eliminates transverse magnetic electromagnetic field generation by such alternating current in the solenoidal coil.

According to the invention, the above mentioned objects as well as other features and advantages are provided in a novel shielded solenoid adapted for well logging measurements having a cylindrical support member open at each of its ends and having a cylindrical wall of a generally rectangular cross-section wherein the wall has a hollow space in the interior of its cross-section. A measurement conductor coil is cylindrically wound in the hollow space of the interior of the cylindrical wall whereby the plane of the cylindrical coil is essentially perpendicular to the axis of the cylindrical support member.

An electrostatic shield is formed of wire wrapped about the exterior of each wall of the cylindrical support member, the wrapping being in spiral loops completely around the entire cylindrical wall so as to envelope the wall and the measurement coil. The shield wire is substantially perpendicular to the measurement coil. The shield wire has an electrical gap provided in each loop about the support member thereby preventing current flow about each loop. A ground wire is disposed about each support member and is electrically connected to each of the shielded wire loops. Preferably, the ground wire has an electrical gap in it thereby creating less than a full current loop coaxially about the support member. The diameter of the shield wire preferably is of a smaller diameter than a skin depth at the frequency of operation selected for the alternating current provided in the measurement coil when used in well logging.

The shield wire is also preferably separated from the measurement conductor coil by the thickness of the walls of the support member in order to minimize shield to measurement conductor coil capacitance.

BRIEF DESCRIPTION OF THE DRAWINGS

The invention as well as additional objects and advantages thereof will best be understood from the following description when read in connection with the accompanying drawings, in which:

FIG. 1 schematically illustrates an exemplary downhole apparatus and surface instrumentation showing in particular an electronic tubular goods caliper in which the shielded solenoid coil of the invention may be used;

FIG. 2 is a perspective view of the shielded solenoidal sensor according to the invention and illustrates in a cutaway portion, a cross-section of the cylindrical wall of the support member, the cylindrical or solenoidal coil and the toroidal shield wrapped about the support member;

FIG. 2A is an enlarged section of the cross-section of the cylindrical wall illustrating an "O" ring provided to maintain the position of cut shield wires forming the toroidal coil;

FIG. 3 illustrates in a bottom view of the toroidal coil a ground ring for electrically connecting each of the wires forming the toroidal shield; and FIG. 4 illustrates schematically the shielded solenoid of the invention in which the cylindrical coil is "caged" by toroidal wrapping of the solenoidal coil and illustrates that each of the toroidal shield coils is grounded.

DESCRIPTION OF THE INVENTION

FIG. 1 shows a well logging system in which the shielded sensor 40 of FIG. 2 may be advantageously employed. FIG. 1 illustrates an electronic caliper tool 10 which determines the inside diameter of tubular members such as casing 20 lining borehole 16.

The tool 10 includes a downhole sonde 12, downhole electronic cartridge 13 and surface equipment 14. The sonde 12 is adapted to be suspended in and movable through tubular member or casing 20 by an armored cable or wireline 18. The wellbore 16 has a casing 20 having an inside diameter which the tool 10 is designed to measure as a function of well depth as the tool is raised or lowered within the casing 20. The wireline or cable 18 may be a single conductor (referred to as mono-cable) or multi-conductor (which may be a hepta-cable having seven conductors). The surface equipment 14 communicates with the sonde 12 via the cable 18 for the purpose of controlling the position of the sonde 12 within the casing 20 and for receiving, processing, displaying and recording signals transmitted from the sonde 12.

A cable-following mechanical transducer 22 and linkage 23 provide position signals indicative of the depth of the sonde 12 and the wellbore 16. Typically, the transducer 22 takes the form of a calibrated pressure wheel urged against the wireline 18 and generates electrical pulses as the wheel rotates due to travel of the sonde 12 within the casing. The downhole tool comprises a sonde 12, electronic cartridge section 13, a pair of centralizers 27a and 27b, a tip or nose member 28 and a cable head adapter 30. The downhole tool is connected to the cable 18 via the cable head adapter 30.

The sonde 12 contains caliper coils 40' and 40" constructed, according to the invention, for making electromagnetic measurements as a function of depth of the sonde and the casing. A signal is generated in the transmitter coil which may be coil 40'. A response signal sensed in coil 40" is proportional to casing inside diameter. The method and apparatus by which the signal proportional to the casing inside diameter is determined is the subject of a copending U.S. patent application assigned to the assignee of the present application and now issued as U.S. Pat. No. 4,546,314. Such patent is incorporated with this patent application for all purposes.

FIG. 2 illustrates the shielded toroidal coil 40 according to the invention. Such shielded sensor or coil may advantageously be used as either of the coils 40' or 40" of the caliper transmitter or receiver coils illustrated in FIG. 1. A cylindrical or solenoidal coil 44 is provided within a space 41 of a generally rectangular doughnut shaped support member 42. The support member as illustrated has a first portion 41" that is in the shape of a outwardly facing "U". After the coil 44 is wound within the bight of the "U", a closing member 41" may be fastened to "U" shaped member 41' to form a generally rectangular support member 42 having a generally cylindrical-rectangular hollow space or opening in which the solenoidal coil 44 is provided.

According to the invention, a toroidal coil 45 is wrapped about the exterior of the cross-section of the support member completely about the cylindrical wall of the support member. As illustrated, the toroidal coil is wrapped from the outside of the support member about the bottom end of the cross-section of the support member and then about the interior of the cylindrical wall and across the top end around the exterior of the cylindrical wall and so on until the wire of the coil 45 completes the spiral wrapping essentially orthogonally, three hundred sixty (360) degrees around the support member.

The diameter of the shielding conductors forming the toroidal coil 45 should be smaller than the skin depth defined by the frequency of operation selected for the alternating current flowing in the solenoidal coil 44. Since induction measurements in open hole and caliper measurements as illustrated in FIG. 1 are at relatively low frequencies (for example, 20,000 Hz), the diameter of the wire 45 must be relatively small.

As further illustrated in FIG. 2, each of the wires of the toroidal coil is interrupted electrically by a cut 46 through a portion of the wires. The cut 46 effectively interrupts the electrical circuit of each loop of the wire 45 about the support member 42, preferably in the top surface as illustrated in FIG. 2.

As illustrated in FIG. 2A which is an enlarged view of a portion of the cross-section of the support member, a preformed groove 47 in the support member 42 provides a space for an "O" ring 48 to be provided, thereby providing a means for insuring that the toroidal coils do not come unwound from the support 42.

An important advantage resulting from the conformal shield 45 about support member 42 and coil 44 is that the solenoidal coil 44 is electrostatically shielded from dielectric effects in the borehole. Another advantage which results from providing the shielding wires 45 toroidally about the support member is that the coil 44 is shielded from end effects with respect to an adjacent toroidal coil. For example, in FIG. 1, coils 40' and 40" are shielded with respect to each other from end effects because of the shielding effect of wires 45 across their ends.

The shielded sensor of FIG. 2 is manufactured by first winding a sensor conductor 44 in a cylindrical space 41 of a toroidally shaped support member 42 wherein the wound sensor of conductor 44 results in a cylindrical coil essentially perpendicular to the axis of the toroidal support member 42. The support member 42 has a groove 47 preformed in its top surface. Next, a shield wire 45 is wrapped about the wall of the support member, the wrapping being in spiral loops from the outside of the support member to the inside of the support member and so on completely around the entire cylindrical wall so as to envelope the wall and the measurement coil. The toroidal loops 45 are essentially perpendicular about the entire loop of the measurement solenoidal coil 44.

The circular groove preformed in the support member 42 facilitates the use of a cutoff die to simultaneously cut all of the individual turns 45 and bend the severed ends down into the groove. A compression die is used to compress an elastomeric ring 48 into the groove 47 to secure the ends of each turn 45. A portion of the insulation of the loops is removed preferably on the bottom surface of the shield and a gapped ground wire is attached to the uninsulated portion thereof.

Although the support member is preferably constructed having a cross-section that is generally rectangular and having a generally rectangular hollow space therein for housing the solenoidal coil, the support member may be of an outwardly facing "U" shape in which the solenoidal coil is wrapped in the bight thereof.

It has been found that it is advantageous to have a sufficient distance between the toroidal loops 45 and the orthogonally oriented solenoidal coil 44 providing a generally rectangular support member comprising two portions 41' and a closing portion 41" provide such distance between the shield loops 45 and the solenoidal coil 44.

It has been discovered that the toroidal coil does not interfere with the effective generation of an axial flux vector and the azimuthal electric field vector which accompanies the coaxial flux vector. In other words, the shielding conductors are effectively transparent to TE electromagnetic fields generated by the alternating current-flow in the solenoidal coil. It has also been discovered that advantageously the toroidal shielding loops 45 substantially eliminate TM electromagnetic field generation by the alternating current flow in the solenoidal coil. Such elimination of the TM field generation is advantageous in that such transverse magnetic fields cause error signals in transmitter receiver pairs such as 40" and 40'' of FIG. 1.

FIG. 3 shows a bottom view of FIG. 2 wherein a ground ring 50 is provided having a gap 55 therein. The ring 50 extends substantially around the three hundred sixty (360) degrees of the bottom of the support member 42. The ground ring 50 is electrically connected to each of the loops of the toroidal coils 45. A lead 50A attached to the ground ring is attached to ground as schematically illustrated in FIG. 4.

Leads 44A and 44B represent the ends of the solenoidal coil 44 and are the outward leads by which alternating current is input in the coil or by which a response voltage is output from the coil. Preferably, the ground ring is attached to the coil loops 45 by grinding away the insulation of each of the loops of the coil 45 and securing the ground ring 50 to uninsulated portions of the loops. The ring 50 is then affixed to the entire unitary shielded sensor 40 by soldering it to the shield wires.

FIG. 4 is a schematic illustration of the shielded solenoidal coil, according to the invention, showing leads 44A and 44B of the solenoidal coil and showing loops of the toroidal shield 45 as well as ground ring 50 and lead 50A connected to ground.

A similar result may be achieved, however, by having the arms of the "U" extend sufficiently from the bight in which the solenoidal coil is wound to provide such distance of the coil 44 as it is wound about the outward ends of the arms. Such separation of the shield loops 45 from the measurement solenoidal coil 44 minimizes the shield to measurement conductor coil capacitance.

Various modifications and alternations in the described structure will be apparent to those skilled in the art of the foregoing description which does not depart from the spirit of the invention. For this reason, these changes are desired to be included in the appended claims. The appended claims recite the only limitation to the present invention and the descriptive manner which is employed for setting forth the embodiments and is to be interpreted as illustrative and not limitative.

What is claimed is:

1. An induction sensor adapted for use in a well logging system, comprising:
   a support member;
   a sensor conductor coiled coaxially around said support member;
   a plurality of shielding conductors coiled essentially orthogonally around the support member and the sensor conductor, each of said shielding conductors having ends and being angularly spaced from each other, said shielding conductors collectively defining at their ends a nonconducting gap, said gap being disposed coaxially around said support member and orthogonally to each of said shielding conductors thereby creating in each shielding conductor less than a complete three hundred sixty degree loop about the support member;
   means disposed within said gap for firmly holding the ends of each of said shielding conductors; and
   a ground wire disposed coaxially about said support member and electrically connected to each of said shielding conductors.

2. The induction sensor of claim 1 wherein said support member has a cross-section shape, said cross-section shape being an outwardly facing "U" shape, said sensor conductor being coiled in the bight of the "U".

3. The induction sensor of claim 1 wherein said support member has a cross-section shape, said cross-section shape being generally rectangular and having a central opening therein, said sensor conductor being coiled within said central opening.

4. The induction sensor of claim 1 wherein said gap defined by the shielding conductors comprises a circular cut, the means for holding comprising a ring of elastomeric material disposed in said cut, the elastomeric material firmly holding the ends of each of said shielding conductors.

5. The induction sensor of claim 1 wherein the ends of said ground wire defines a gap thereby creating in said ground wire less than a three hundred sixty degree loop coaxially about said support member.

6. The induction sensor of claim 1 wherein the diameter of said shielding conductors is smaller than a skin depth at a frequency of operation selected for said well logging system.

7. A shielded coil adapted for use in a well logging apparatus, comprising:
   a support member disposed coaxially about an axis, said member having a cross sectional shape which defines a hollow space at the interior of the cross-section;
   a conductor coil disposed in said hollow space and wound coaxially around said support member;

a shield wrapped essentially orthogonally around said support member and said conductor coil thereby enveloping said support member and said conductor coil, said shield being cut at its ends thereby defining a groove disposed substantially coaxially about said axis;

means disposed in said groove for firmly holding the ends of said shield thereby preventing said shield from un-wrapping about said support member; and grounding means connected to said shield for grounding said shield.

8. The coil of claim 7 wherein the grounding means comprises a ground wire disposed coaxially about said support member, the wire having ends, the ends defining an electrical gap thereby creating in said ground wire less than a three hundred sixty degree loop coaxially about said support member.

9. The coil of claim 8 wherein the diameter of the shield is smaller than a skin depth at a frequency of operation selected for said well logging apparatus.

10. The coil of claim 7 wherein the shield is separated from the conductor coil by a wall of said support member thereby minimizing shield to conductor coil capacitance.

11. A shielded coil adapted for use in a well logging system, comprising:

a conductor coil having outside, bottom, top and interior surfaces;

a plurality of grounded shielding conductors disposed essentially orthogonally to said conductor coil about said outside, bottom, top and interior surfaces thereof, each of said plurality of shielding conductors being interrupted at its ends thereby defining a gap between said ends; and means disposed in said gap and connected to the ends of said shielding conductors from firmly holding the ends of each of said shielding conductors, whereby said shielding conductors cannot unwrap from about said conductor coil.

12. A shielded coil of claim 11 wherein said shielding conductors extend essentially as a three hundred and sixty degree loop about the conductor coil.

13. A shielded coil of claim 11 wherein said shielding conductors are angularly spaced from each other about the respective surfaces of said conductor coil.

14. A shielded coil of claim 11 wherein said conductors have a diameter that is smaller than a skin depth defined by a frequency of operation selected for the alternating current flowing in said conductor coil.

15. An induction sensor adapted for use in a well logging system, comprising, a conductor coil having outside, bottom, top and interior surfaces;

a shield disposed about said outside, bottom, top and interior surfaces of said conductor coil, the disposition of said shield about said conductor coil defining a groove which is coincident with said conductor coil, said shield having ends; and means disposed in said groove for firmly holding in place the ends of said shield, whereby said shield cannot easily be removed from the surfaces of said conductor coil.

* * * * *